(12) United States Patent
Jiang et al.

(10) Patent No.: US 12,445,585 B2
(45) Date of Patent: Oct. 14, 2025

(54) CURVED GRID FOR ACQUIRING SPATIAL TRACK COORDINATES OF SOUND SOURCE OBJECTS OF AUDIO ELEMENTS IN AN AUDIO STREAM IN VIDEO DATA

(71) Applicant: HUIZHOU VISION NEW TECHNOLOGY CO., LTD., HuiZhou (CN)

(72) Inventors: Qingxing Jiang, HuiZhou (CN); Weibiao Gao, HuiZhou (CN)

(73) Assignee: HUIZHOU VISION NEW TECHNOLOGY CO., LTD., HuiZhou (CN)

( * ) Notice: Subject to any disclaimer, the term of this patent is extended or adjusted under 35 U.S.C. 154(b) by 0 days.

(21) Appl. No.: 18/286,495

(22) PCT Filed: Dec. 14, 2022

(86) PCT No.: PCT/CN2022/139009
§ 371 (c)(1),
(2) Date: Oct. 11, 2023

(87) PCT Pub. No.: WO2024/124437
PCT Pub. Date: Jun. 20, 2024

(65) Prior Publication Data
US 2025/0088619 A1  Mar. 13, 2025

(30) Foreign Application Priority Data
Dec. 14, 2022 (CN) .......................... 202211608964.5

(51) Int. Cl.
*H04N 13/161* (2018.01)
*G06T 7/20* (2017.01)
(52) U.S. Cl.
CPC ............. *H04N 13/161* (2018.05); *G06T 7/20* (2013.01)

(58) Field of Classification Search
CPC ....... H04N 13/161; H04N 13/261; G06T 7/20
See application file for complete search history.

(56) References Cited

U.S. PATENT DOCUMENTS 10,142,759 B2 * 11/2018 Ugur ....................... G06F 3/165
10,200,804 B2 *  2/2019 Chen ......................... H04S 3/02
(Continued)

FOREIGN PATENT DOCUMENTS

CN   111666802 A     9/2020
CN   113316078 A  *  8/2021 ............. G06V 20/40
(Continued)

OTHER PUBLICATIONS

Senocak A. et al. "Learning to Localize Sound Sources in Visual Scenes: Analysis and Applications" IEEE Transactions on Pattern Analysis and Machine Intelligence, vol. 43, No. 5, May 2021 (Year: 2021).*

(Continued)

*Primary Examiner* — Richard A Hansell, Jr.
(74) *Attorney, Agent, or Firm* — The Roy Gross Law Firm, LLC; Roy D. Gross

(57) ABSTRACT

A method of processing video data includes constructing a curved grid matching a display screen of the display device and acquiring a coordinate transformation relationship between the display screen and the curved grid; acquiring an image stream and an audio stream in the video data and identifying motion track coordinates of sound source objects in the image stream corresponding to different audio elements in the audio stream according to the image stream and the audio stream; acquiring spatial track coordinates of the sound source object corresponding to each of the audio elements on the curved grid according to the motion track coordinates of the sound source object and the coordinate transformation relationship; and constructing a stereo video based on the image stream, each of the audio elements in the (Continued)

audio stream, and the spatial track coordinates of each of the audio elements corresponding to the sound source object.

12 Claims, 4 Drawing Sheets

(56) References Cited

U.S. PATENT DOCUMENTS

| | | | | |
|---|---|---|---|---|
| 12,137,335 | B2* | 11/2024 | Zoepf | H04S 7/303 |
| 2003/0053680 | A1 | 3/2003 | Lin et al. | |
| 2019/0104364 | A1* | 4/2019 | Nawfal | H04S 5/005 |
| 2020/0154225 | A1* | 5/2020 | Lee | H04N 21/8106 |
| 2020/0288255 | A1* | 9/2020 | Jung | G06F 18/253 |
| 2021/0240431 | A1* | 8/2021 | Gorzel | G06F 3/165 |
| 2021/0400421 | A1* | 12/2021 | Tsingos | H04R 5/02 |
| 2023/0126214 | A1* | 4/2023 | Treadway | G06T 7/11 |
| | | | | 345/419 |

FOREIGN PATENT DOCUMENTS

| | | | |
|---|---|---|---|
| CN | 114040318 A | 2/2022 | |
| CN | 115174959 A | 10/2022 | |
| WO | WO-2022059869 A1 * | 3/2022 | ....... H04N 21/44008 |

OTHER PUBLICATIONS

Owens and Efros "Audio-Visual Scene Analysis with Self-Supervised Multisensory Features", arXiv: 1804.03641v2, Oct. 9, 2018 (Year: 2018).*

PCT International Search Report for International Application No. PCT/CN2022/139009, mailed on Aug. 17, 2023, 8pp.

PCT Written Opinion of the International Searching Authority for International Application No. PCT/CN2022/139009, mailed on Aug. 17, 2023, 6pp.

* cited by examiner

CURVED GRID FOR ACQUIRING SPATIAL TRACK COORDINATES OF SOUND SOURCE OBJECTS OF AUDIO ELEMENTS IN AN AUDIO STREAM IN VIDEO DATA

CROSS REFERENCE TO RELATED APPLICATIONS

This application is a US national phase application based upon an International Application No. PCT/CN2022/139009, filed on Dec. 14, 2022, which claims priority to Chinese Patent Application No. 202211608964.5, filed on Dec. 14, 2022, and entitled "METHOD OF PROCESSING VIDEO DATA, VIDEO DATA PROCESSING DEVICE, DISPLAY DEVICE, AND STORAGE MEDIUM". The entire disclosures of the above applications are incorporated herein by reference.

TECHNICAL FIELD

The present application relates to the technical field of audio and video data processing, and specifically relates to a method of processing video data, a video data processing device, a display device, and a non-volatile computer-readable storage medium (referred to as storage medium).

BACKGROUND

With the development of science and technology, display screens of display devices such as televisions (TVs) are getting larger and larger. A sound output position of the display device is still set at the bottom or both sides of the TV. Moreover, audio in most of the existing video data is two-channel audio, and an audio sound field in the vertical direction is missing when the display screen is playing a video data, and a spatial sense of the audio is weak. This is difficult to match with video images, and a user has a low sense of immersion in the process of using the display device.

Technical Problem

Embodiments of the present application provide a method of processing video data, a video data processing device, a display device, and a storage medium, so as to improve a spatial sense of audio to match video images.

SUMMARY

Embodiments of the present application provide a method of processing video data, applied to a display device, comprising:
constructing a curved grid matching a display screen of the display device and acquiring a coordinate transformation relationship between the display screen and the curved grid;
acquiring an image stream and an audio stream in the video data and identifying motion track coordinates of sound source objects in the image stream corresponding to different audio elements in the audio stream according to the image stream and the audio stream;
acquiring spatial track coordinates of the sound source object corresponding to each of the audio elements on the curved grid according to the motion track coordinates of the sound source object and the coordinate transformation relationship; and
constructing a stereo video based on the image stream, each of the audio elements in the audio stream, and the spatial track coordinates of each of the audio elements corresponding to the sound source object.

Embodiments of the present application provide a video data processing device, applied to a display device, comprising:
a curved grid constructer configured to construct a curved grid matching a display screen of the display device and acquire a coordinate transformation relationship between the display screen and the curved grid;
a motion track acquirer configured to acquire an image stream and an audio stream in the video data and identify motion track coordinates of sound source objects in the image stream corresponding to different audio elements in the audio stream according to the image stream and the audio stream;
a spatial track acquirer configured to acquire spatial track coordinates of the sound source object corresponding to each of the audio elements on the curved grid according to the motion track coordinates of the sound source object and the coordinate transformation relationship; and
a stereo video constructer configured to construct a stereo video based on the image stream, each of the audio elements in the audio stream, and the spatial track coordinates of each of the audio elements corresponding to the sound source object.

Embodiments of the present application further provide a display device comprising: one or more processors; a memory; and one or more computer readable instructions, wherein the one or more computer readable instructions are stored in the memory and configured to be executed by the processor to implement the following steps:
constructing a curved grid matching a display screen of the display device and acquiring a coordinate transformation relationship between the display screen and the curved grid;
acquiring an image stream and an audio stream in the video data and identifying motion track coordinates of sound source objects in the image stream corresponding to different audio elements in the audio stream according to the image stream and the audio stream;
acquiring spatial track coordinates of the sound source object corresponding to each of the audio elements on the curved grid according to the motion track coordinates of the sound source object and the coordinate transformation relationship; and
constructing a stereo video based on the image stream, each of the audio elements in the audio stream, and the spatial track coordinates of each of the audio elements corresponding to the sound source object.

Embodiments of the present application further provide a non-volatile computer-readable storage medium, wherein computer-readable instructions are stored in the non-volatile computer-readable storage medium, and the computer-readable instructions are loaded by a processor to perform the following steps:
constructing a curved grid matching a display screen of the display device and acquiring a coordinate transformation relationship between the display screen and the curved grid;
acquiring an image stream and an audio stream in the video data and identifying motion track coordinates of sound source objects in the image stream corresponding to different audio elements in the audio stream according to the image stream and the audio stream;

acquiring spatial track coordinates of the sound source object corresponding to each of the audio elements on the curved grid according to the motion track coordinates of the sound source object and the coordinate transformation relationship; and constructing a stereo video based on the image stream, each of the audio elements in the audio stream, and the spatial track coordinates of each of the audio elements corresponding to the sound source object.

Beneficial Effect

The beneficial effects of the present application include: constructing a curved grid matching the display screen of the display device, after acquiring the track coordinates of each audio element in the audio stream corresponding to the sound source object in the image stream, determining the spatial track coordinates of each audio element on the corresponding curved grid based on the motion track coordinates, and finally, constructing a stereo video containing spatial audio based on the spatial track coordinates of each audio element on the corresponding curved grid. Compared with the original audio stream, the audio sound field information in the vertical direction of the audio stream is complemented by the spatial track coordinates of the curved grid. This enables the spatial sense of the audio in the stereo video to match video images, improving the user's sense of immersion when watching the stereo video.

BRIEF DESCRIPTION OF THE DRAWINGS

In order to more clearly illustrate the technical solutions in the embodiments of the present application, the following briefly introduces the drawings that need to be used in the description of the embodiments. Apparently, the drawings in the following description are only some embodiments of the present application. For those skilled in the art, other drawings can also be obtained based on these drawings without any creative effort.

DETAILED DESCRIPTION OF ILLUSTRATED EMBODIMENTS

Specific structural and functional details disclosed herein are representative only and are for purposes of describing example embodiments of the present application. This application may, however, be embodied in many alternative forms and should not be construed as limited to only the embodiments set forth herein.

The technical solutions in the embodiments of the present application will be clearly and completely described below in conjunction with the drawings in the embodiments of the present application. Apparently, the described embodiments are only some of the embodiments of this application, not all of them. Based on the embodiments in this application, all other embodiments obtained by those skilled in the art without making creative efforts belong to the scope of protection of this application.

In the description of the present application, the terms "first" and "second" are used for descriptive purposes only and cannot be understood as indicating or implying relative importance or implicitly specifying the quantity of indicated technical features. Thus, a feature defined as "first" or "second" may explicitly or implicitly include one or more of said features. In the description of the present application, "plurality" means two or more, unless otherwise specifically defined.

In the description of this application, the word "for example" is used to mean "serving as an example, case, or illustration". Any embodiment described in this application as "such as" is not necessarily to be construed as preferred or advantageous over other embodiments. The following description is given to enable those skilled in the art to make and use the invention. In the following description, details are set forth for purposes of explanation. It should be understood that those skilled in the art would recognize that the present invention may be practiced without the use of these specific details. In other instances, well-known structures and procedures are not described in detail to avoid obscuring the description of the present invention with unnecessary detail. Thus, the present invention is not intended to be limited to the embodiments shown, but is to be accorded the widest scope consistent with the principles and features disclosed in this application.

Figure 1:
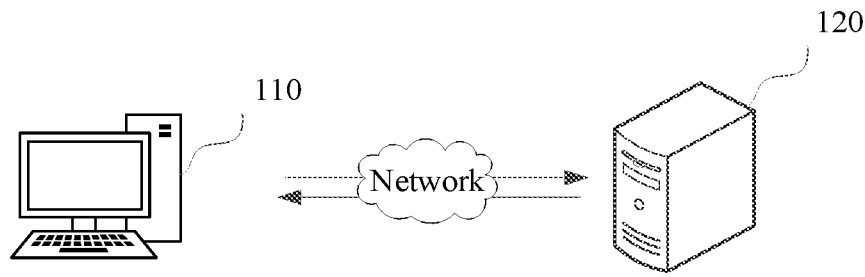
FIG. 1 is an application scenario diagram of a video data processing method according to one or more embodiments.

The video data processing method provided in this application can be applied to the application environment shown in FIG. 1. A terminal 110 communicates with a server 120 through a network to receive a video data sent by the server 120. The terminal 110 constructs an curved grid matching a display screen and acquires a coordinate transformation relationship between the display screen and the curved grid. The terminal 110 acquires an image stream and an audio stream in the video data, and the terminal 110 identifies motion track coordinates of a sound source object corresponding to different audio elements in the audio stream in the image stream according to the image stream and the audio stream. The terminal 110 acquires spatial track coordinates of the sound source object corresponding to each audio element on the curved grid according to the motion track coordinates of the sound source object and the coordinate transformation relationship. Finally, the terminal 110 constructs a stereo video based on the image stream, each audio element in the audio stream, and the spatial track coordinates of each audio element corresponding to the sound source object. The terminal 110 is a computer device with a display screen, which can be but not limited to various personal computers, notebook computers, smart phones, tablet computers and portable wearable devices. The server 120 can be implemented by an independent server or a server cluster composed of multiple servers.

Figure 2:
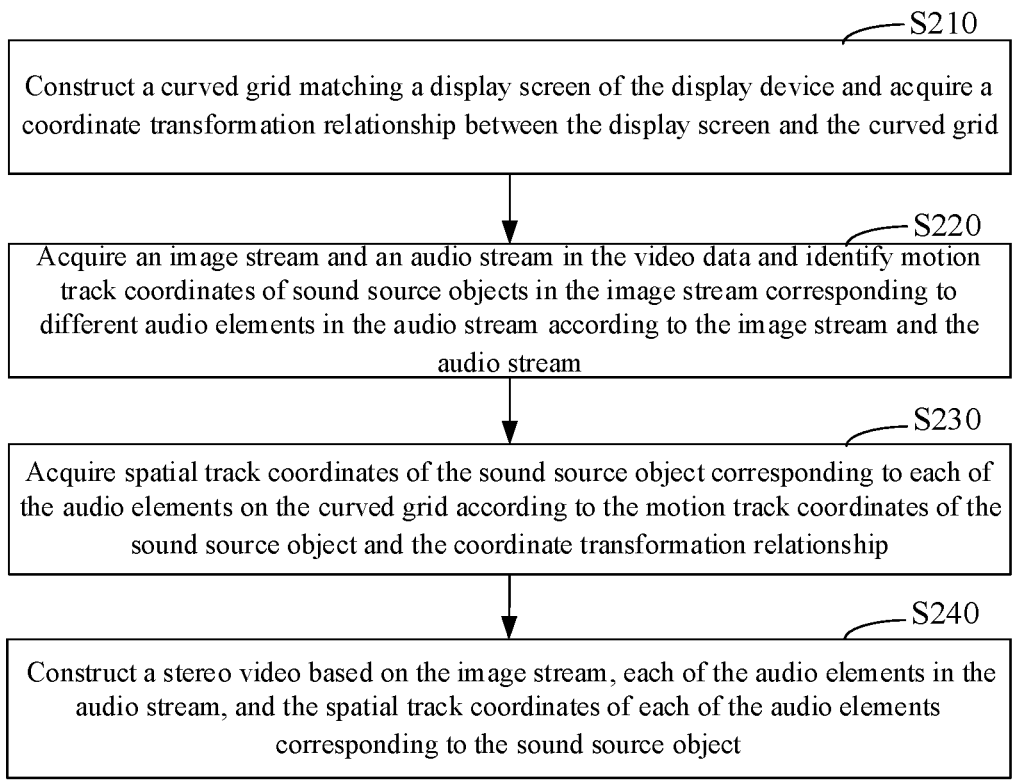
FIG. 2 is a schematic flowchart of a video data processing method according to one or more embodiments.

Referring to FIG. 2, an embodiment of the present application provides a video data processing method, which is mainly illustrated by applying a method to the terminal 110 shown in FIG. 1. The method includes steps S210 to S240, as follows:

Step S210: Construct a curved grid matching a display screen of the display device and acquire a coordinate transformation relationship between the display screen and the curved grid.

The curved grid is a virtual grid constructed based on the plane where the display screen of the display device is located, and the curved grid is used to simulate the spatial position of the audio element corresponding to the sound source object, so as to complement the sound field information of the audio element in the vertical direction. The coordinate transformation relationship between the display screen and the curved grid refers to the transformation relationship between the two-dimensional coordinates corresponding to the display screen and the three-dimensional coordinates corresponding to the curved grid. It can be understood that, compared with the two-dimensional coordinates corresponding to the display screen, the three-dimensional coordinates corresponding to the curved grid increase the coordinate information in the vertical direction.

Specifically, constructing a curved grid matching the display screen of the display device may be to construct a spherical surface based on the display screen of the display device. Furthermore, the spherical surface corresponding to the hemisphere where the display screen is located is used as the curved grid, and the coordinate transformation relationship between the display screen and the curved grid is obtained based on the spherical coordinate expression.

Figure 3:
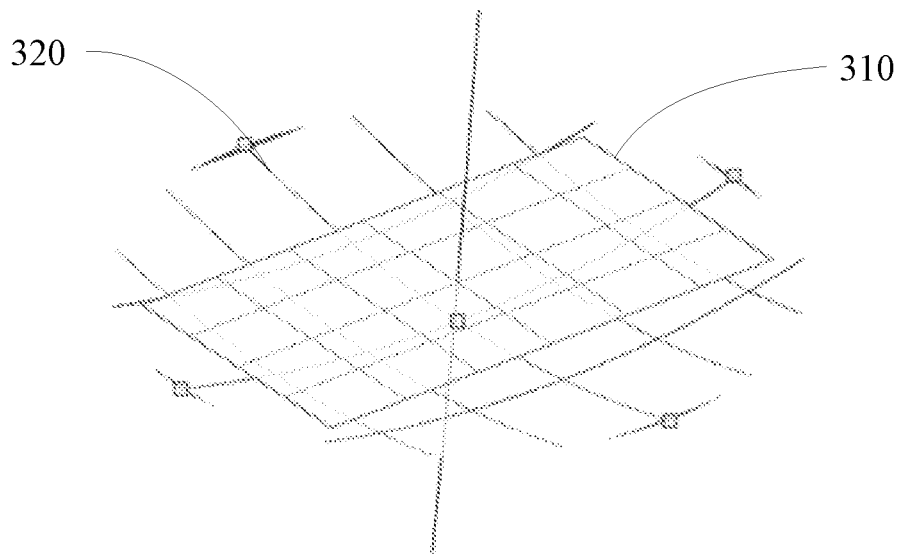
FIG. 3 is a schematic diagram of a display screen and a curved grid according to one or more embodiments.

For example, taking the display device as an example, the size of the display screen of the TV is generally 16:9. The display screen is 9 units high and 16 units wide. According to the optimal viewing length ratio, the distance between the display screen and the audience is set to 70 units. Therefore, based on the display screen (assuming that its coordinate information is (0, 0, 0)) and the audience's location information (assuming that its coordinate information is (0, 0, −70)), construct a sphere with the viewer's location information as the center of the sphere, and through the vertices of the display screen, use the sphere corresponding to the hemisphere where the display screen is located as a curved grid. Referring to FIG. 3, a two-dimensional plane 310 is a display screen, and a three-dimensional plane 320 is a curved grid matching the display screen.

Step S220: Acquire an image stream and an audio stream in the video data and identify motion track coordinates of sound source objects in the image stream corresponding to different audio elements in the audio stream according to the image stream and the audio stream.

The video data refers to the video content received by the display device in real time, the image stream refers to an image data in the video data, and the audio stream refers to the audio data in the video data. Specifically, after receiving the video data, the display device may separate the image data and the audio data in the video data to obtain the image stream and the audio stream. This facilitates subsequent processing of the image stream and the audio stream respectively.

The audio stream often includes one or more audio elements corresponding to different audio elements, and the sound source object refers to the sounding object of the audio element in each frame image in the image stream. For example, when the audio stream includes a character's voice, the audio stream includes a character's voice element. When the audio stream includes car engine sound, the audio stream includes car sound elements. Specifically, after the display device obtains the audio stream, the audio element separation technology may be used to separate the audio elements in the audio stream, so as to obtain multiple independent audio elements in the audio stream. It can be understood that the audio element separation technology includes but not limited to human voice separation technology, musical instrument sound separation technology, and the like.

The sound source object of the audio element refers to the sounding object or sounding point corresponding to the audio element in the frame image of the image stream. The motion track coordinates refer to the motion track of the audio element corresponding to the sound source object in the image stream. For example, the audio element corresponds to the sound source object in the lower left corner of the first frame image in the image stream, and in the upper right corner of the third frame image in the image stream. Then the motion track coordinates of the audio element corresponding to the sound source object in the image stream from the first frame to the third frame are moving from the coordinate point in the lower left corner to the coordinate point in the upper right corner. More specifically, the motion track coordinates may include image coordinates of each frame image of the sound source object in the image stream.

Specifically, after obtaining the audio stream and the image stream in the video data, for any audio element in the audio stream, the image coordinates of the audio element corresponding to the sound source object in each frame image in the image stream can be identified. Furthermore, based on the image coordinates corresponding to the sound source object corresponding to the audio element in each frame image, the motion track coordinates of the audio element in the image stream are obtained.

Step S230: Acquire spatial track coordinates of the sound source object corresponding to each of the audio elements on the curved grid according to the motion track coordinates of the sound source object and the coordinate transformation relationship.

The spatial track coordinates refer to the coordinate information of the audio element corresponding to the sound source object on the curved grid. It can be understood that, compared with the motion track coordinates, the spatial track coordinates complement the sound field information in the vertical direction of the audio element corresponding to the sound source object.

After determining the running track coordinates of the sound source object, specifically, based on the coordinate transformation relationship between the two-dimensional plane coordinates of the display screen and the three-dimensional plane coordinates of the curved grid, the image coordinates corresponding to each frame image in the motion track coordinates are converted into spatial coordinates on the curved grid to obtain the spatial track coordinates on the curved grid.

Step S240: Construct a stereo video based on the image stream, each of the audio elements in the audio stream, and the spatial track coordinates of each of the audio elements corresponding to the sound source object.

After obtaining the spatial track coordinates of the sound source object corresponding to each audio element in the audio stream, based on the control track coordinates of each audio element corresponding to the sound source object, perform audio rendering processing on the audio data of each audio element to obtain stereo audio data. Then, stereo audio data and image streams are combined to generate stereo video.

In the above method for processing video data, construct a curved grid matching the display screen of the display device and obtain the coordinate transformation relationship between the display screen and the curved grid. Then, obtain the image stream and audio stream in the video data. According to the image stream and the audio stream, identify the motion track coordinates of the sound source object corresponding to the different audio elements in the audio stream in the image stream. According to the motion track coordinates of the sound source object and the coordinate transformation relationship, obtain the spatial track coordinates of each audio element corresponding to the sound source object on the curved grid. The stereo video is constructed based on the image stream, each audio element in the audio stream, and the spatial track coordinates of each audio element corresponding to the sound source object. Further, construct a curved grid matching the display screen of the display device, and after obtaining the track coordinates of each audio element in the audio stream corresponding to the sound source object in the image stream, determine the spatial track coordinates of each audio element on the corresponding curved grid based on the motion track coordinates. Finally, a stereo video containing spatial audio is constructed based on the spatial track coordinates of each audio element on the corresponding curved grid. Compared with the original audio stream, the audio sound field information in the vertical direction of the audio stream is complemented by the spatial track coordinates of the curved grid. This enables the spatial sense of the audio in the stereo video to match the video image, improving the user's sense of immersion when watching the stereo video.

Figure 4A:
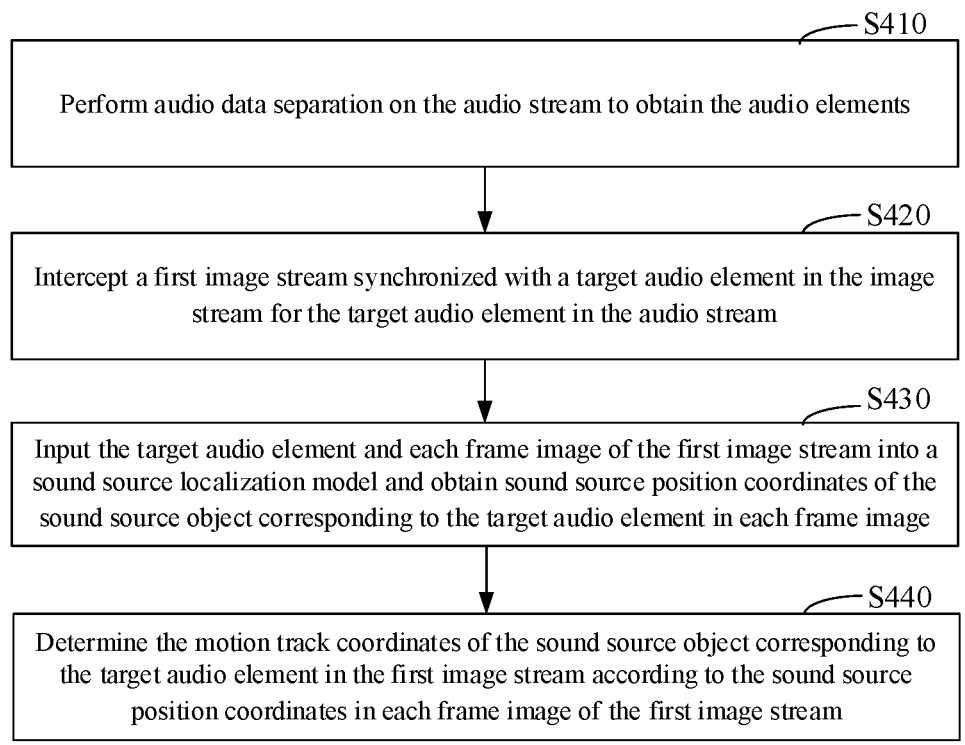
FIG. 4A is a schematic flowchart of steps of acquiring motion track coordinates of audio elements corresponding to sound source objects according to one or more embodiments.
Figure 4B:
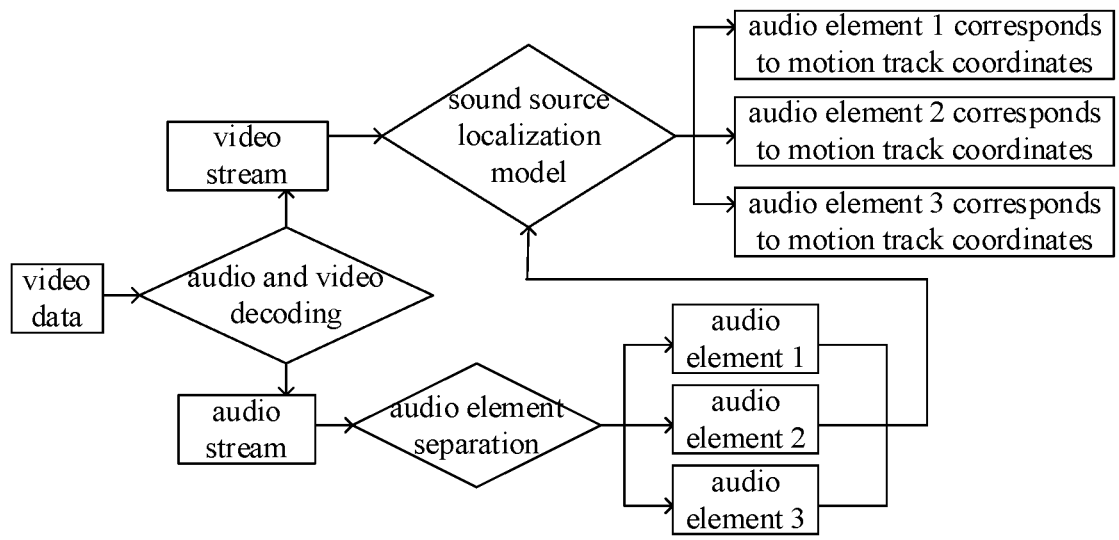
FIG. 4B is another schematic diagram of steps of acquiring motion track coordinates of audio elements corresponding to sound source objects according to one or more embodiments.

In one of the embodiments, referring to FIG. 4A and FIG. 4B, as shown in FIG. 4A, identifying the motion track coordinates of the sound source objects in the image stream corresponding to the different audio elements in the audio stream according to the image stream and the audio stream includes:

Step S410: Perform audio data separation on the audio stream to obtain the audio elements.

The audio element separation technology can be used to separate the audio elements in the audio stream to obtain multiple independent audio elements in the audio stream. It can be understood that the audio element separation technology includes but not limited to human voice separation technology, musical instrument sound separation technology, and the like.

Step S420: Intercept a first image stream synchronized with a target audio element in the image stream for the target audio element in the audio stream.

After obtaining the audio elements in the audio stream, any audio element can be used as a target audio element in turn for subsequent processing. It can be understood that it is possible to locate the sound source position information of the sound source object corresponding to the audio element in the image stream only when the audio element exists. Therefore, after the target audio element is acquired, the image stream within the duration of the target audio element may be acquired first. That is, the first image stream synchronized with the target audio element is acquired.

Step S430: Input the target audio element and each frame image of the first image stream into a sound source localization model and obtain sound source position coordinates of the sound source object corresponding to the target audio element in each frame image.

The sound source localization model is a trained model for predicting position information of the target audio element corresponding to the sound source object in the frame image of the first image stream. It can be understood that the sound source localization model may be a neural network model, a machine learning model, or the like.

After obtaining the target audio element and the first image stream corresponding to the target audio element, the target audio element and each frame image in the first image stream may be input into the sound source localization module. The sound source localization model is used to predict the predicted position coordinates of the target audio element corresponding to the sound source object in the frame image and the confidence degrees corresponding to each predicted position. Further, the sound source position coordinates of the sound source object corresponding to the target audio element are determined from the predicted position based on each predicted position coordinate and its confidence degrees.

In one of the embodiments, inputting the target audio element and each frame image of the first image stream into the sound source localization model and obtaining the sound source position coordinates of the sound source object corresponding to the target audio element in each frame image comprises: acquiring a target frame image and a historical frame image corresponding to a current prediction step from the first image stream; inputting the target audio element and the historical frame image into the sound source localization model and obtaining confidence degrees of different prediction regions of the target audio element corresponding to the sound source object in the target frame image; if a maximum confidence degree among the confidence degrees of each of the prediction regions is greater than a preset confidence threshold value, determining the sound source position coordinates of the target audio element corresponding to the sound source object in the target frame image according to a position information of the prediction region corresponding to the maximum confidence degree; and setting the sound source position coordinates of the sound source object corresponding to the target audio element in the target frame image to a null value if the maximum confidence degree among the confidence degrees of each prediction region is less than or equal to the preset confidence threshold value.

It can be understood that the sound source localization model performs frame-by-frame processing on frame images in the first image stream. That is, the sound source localization model predicts the position information of the sound source object of the target audio element in a frame image at each prediction step. The target frame image of the current prediction step refers to the frame image currently processed by the sound source localization model in the first image stream. The historical frame image refers to the frame image in the historical time period corresponding to the target frame image in the first image stream. For example, the target frame image of the current prediction step is the frame image of the nth frame in the first image stream, and the historical frame images corresponding to the target frame image may be the frame images of the (n−5)th frame to the (n−1)th frame in the first image stream.

The prediction region refers to the position where the target audio element corresponds to the sound source object in the current frame image. That is, the sound source position of the target audio element. The confidence degrees of the prediction region refer to the probability value that the prediction region is the location of the sound source object corresponding to the target audio element. Specifically, after the historical frame images are acquired, the historical frame images may be input into the sound source localization model. The sound source localization model is used to predict the prediction region of the target audio element in the current frame image, and the confidence degree of each prediction region.

Determine the target prediction region with the highest confidence degree among the prediction regions. When the confidence degree of the target prediction region is greater than the preset reliability threshold, the target prediction region is determined as the sound source position of the sound source object corresponding to the target audio element. When the confidence degree of the target prediction region is less than or equal to the preset confidence threshold, the confidence degrees of all the prediction regions in the target frame image are less than or equal to the preset confidence threshold. Determine the sound source position of the sound source object corresponding to the target audio element in the target frame image, and set the sound source position information of the sound source object corresponding to the target audio element in the target frame image to a null value.

It can be understood that when the sound source position information of all frame images in the first image stream corresponding to the sound source object of the target audio element is set to null, the target audio element is background audio, and the target sound effect element may not be processed subsequently.

Step S440: Determine the motion track coordinates of the sound source object corresponding to the target audio element in the first image stream according to the sound source position coordinates in each frame image of the first image stream.

After obtaining the sound source position coordinates of the sound source object corresponding to the target audio element in each frame image of the first image stream, the sound source position coordinates corresponding to each frame image may be determined as the motion track coordinates of the sound source object corresponding to the audio element in the first image stream.

Considering that there may be a sound source object corresponding to the target audio element in the previous frame image in the video data, while the current frame image does not exist the target audio element corresponding to the sound source object, and in the next frame image, the target audio element corresponds to the sound source object again. In order to ensure the continuity of the motion track of the target audio element, in one of these embodiments, determining the motion track coordinates of the sound source object corresponding to the target audio element in the first image stream according to the sound source position coordinates in each frame image of the first image stream comprises: acquiring invalid frame images whose sound source position coordinates of the sound source object corresponding to the target audio element are a null value; and if the invalid frame images comprise consecutive invalid frame images whose number is less than a preset value, according to the sound source position coordinates of the target audio element corresponding to the sound source object in a previous frame image and the sound source position coordinates in a subsequent frame image, acquiring the sound source position coordinates in the invalid frame images.

The previous frame image refers to the frame image at the previous moment corresponding to the invalid frame image, and the subsequent frame image refers to the frame image at the subsequent moment corresponding to the invalid frame image. For example, invalid frame images are frame images at (n−1) time, n time and (n+1) time. The previous frame image corresponding to the invalid frame image refers to the frame image at (n−2) time, and the subsequent frame image corresponding to the invalid frame image refers to the frame image at (n+2) time.

Specifically, to obtain an invalid frame image whose sound source position coordinate is null, and obtain the consecutive invalid frame images among all invalid frame images, when the number of consecutive invalid frame images is greater than or equal to the preset value, determine that the target audio element is background audio during the time period corresponding to the continuous invalid frame images, and when the number of consecutive invalid frame images is less than the preset value, determine that the target audio element is not background audio within the time corresponding to the consecutive invalid frame images. Based on the sound source position coordinates of the target audio element corresponding to the sound source object in the previous frame image and the sound source position coordinates in the subsequent frame image, the sound source position coordinates in the invalid frame image are calculated by an interpolation algorithm.

Through the sound source position coordinates of the target audio element in the previous frame image and the sound source position coordinates in the subsequent frame image, predict the sound source position coordinates of the target audio element in the invalid frame image to complement the running track coordinates in the first image stream. This ensures the integrity of the motion track coordinates of the target audio element, and the subsequent stereo objectification is realized based on the motion track coordinates of the target audio element, which can effectively improve the authenticity of the target audio element.

Referring to FIG. 4B, FIG. 4B shows the acquisition process of the motion track coordinates of different audio elements corresponding to the sound source object in the image stream. Specifically, after receiving the video data, the video data can be decoded at CPU to obtain the audio stream and the image stream. Furthermore, the audio stream and the first image stream synchronized with the audio stream are input into the sound source localization model, and the sound source position coordinates of the audio element corresponding to the sound source object in each frame image in the first image stream are identified through the sound source localization model. Finally, based on the sound source position coordinates of the audio element corresponding to the sound source object in each frame image, the motion track coordinates of the audio element corresponding to the sound source object in the first image stream are determined.

Figure 5A:
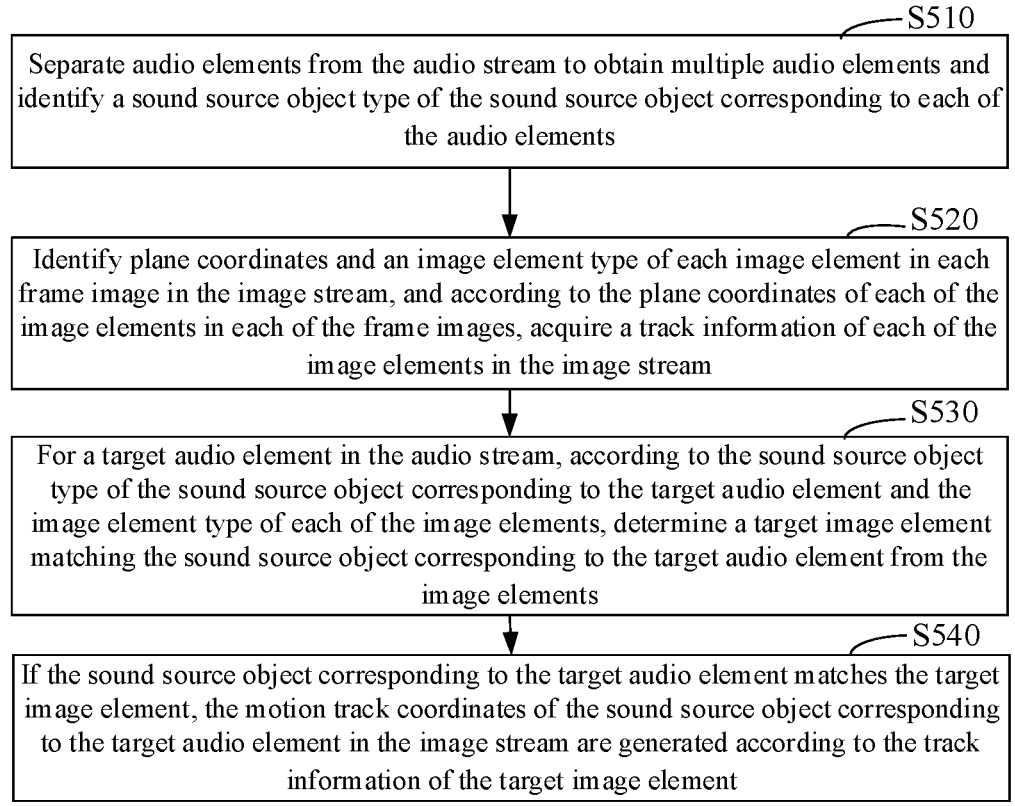
FIG. 5A is another schematic diagram of motion track coordinates of audio elements corresponding to sound source objects according to one or more embodiments.
Figure 5B:
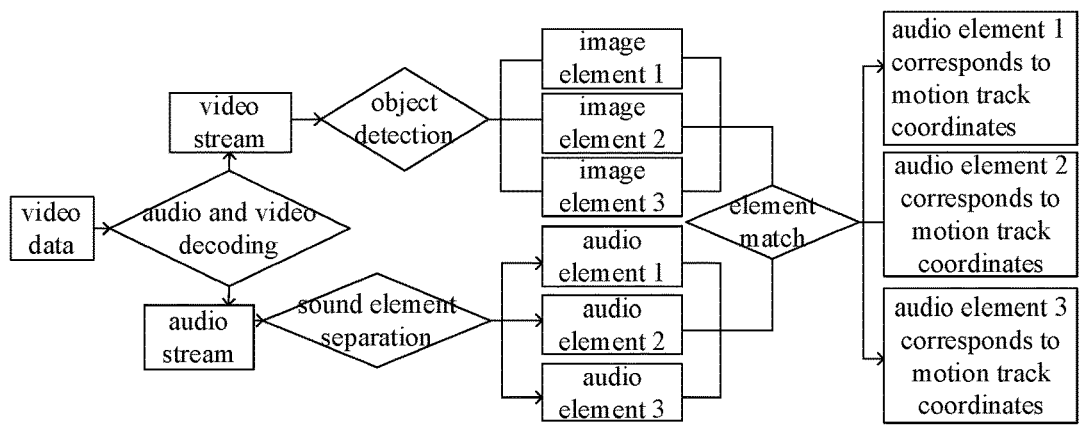
FIG. 5B is still another schematic diagram of motion track coordinates of audio elements corresponding to sound source objects according to one or more embodiments.

In one of the embodiments, referring to FIG. 5A and FIG. 5B, as shown in FIG. 5A, identifying the motion track coordinates of the sound source objects in the image stream corresponding to the different audio elements in the audio stream according to the image stream and the audio stream comprises:

Step S510: Separate audio elements from the audio stream to obtain multiple audio elements and identify a sound source object type of the sound source object corresponding to each of the audio elements.

The sound source object type refers to the type of objects such as objects that emit audio elements, including but not limited to portrait types, musical instrument types, animal types, and mechanical types. Specifically, the audio element separation technology may be used to separate the audio elements in the audio stream, so as to obtain multiple independent audio elements in the audio stream. After acquiring each audio element, the sound source object type of the sound source object corresponding to the audio element can be identified through the sound source object recognition model. The object recognition model may be a pre-trained neural network model for recognizing the sound source object type of the sound source object corresponding to different audio elements.

Step S520: Identify plane coordinates and an image element type of each image element in each frame image in the image stream, and according to the plane coordinates of each of the image elements in each of the frame images, acquire a track information of each of the image elements in the image stream.

Image elements refer to different objects in a frame image, including but not limited to portraits, musical instruments, animals, machinery, etc. The plane coordinates refer to the position information of the image elements in the frame image. The image element type refers to information for identifying the object type corresponding to the image element. Specifically, the image element recognition model can be used to identify the location information (i.e., plane coordinates) and category information (i.e., image element type) of each image element in the frame image. The image element recognition model can be a pre-trained neural network model for object detection.

After obtaining the plane coordinates of each frame image of different image elements in the image stream, the motion information of different image elements in the image stream is determined based on the plane coordinates in each frame image.

Step S530: For a target audio element in the audio stream, according to the sound source object type of the sound source object corresponding to the target audio element and the image element type of each of the image elements, determine a target image element matching the sound source object corresponding to the target audio element from the image elements.

After the audio element is determined, any audio element is determined as the target audio element in turn, and then the target image element corresponding to the target audio element in each image element is determined. Specifically, the sound source object type of the sound source object corresponding to the target audio element may be matched with the image element type of each image element. If the sound source object type of the target audio element is the same as a certain image element type, it can be determined that the image element corresponding to the image element type is the target image element of the target audio element. That is, the image element is the object that emits the target audio element.

Step S540: If the sound source object corresponding to the target audio element matches the target image element, the motion track coordinates of the sound source object corresponding to the target audio element in the image stream are generated according to the track information of the target image element.

After it is determined that the sound source object corresponding to the target audio element matches the target image element, the track information of the target image element in the image stream is determined as the motion track coordinates of the sound source object corresponding to the target audio element in the image stream.

Further, if the sound source object corresponding to the target audio element cannot match the target image element, then the target audio element is background audio.

By decoupling audio data and image data, respectively identify the sound source object types of different audio elements and the image element types of different image elements in the frame image. Further, based on the sound source object type and the image element type, the image element corresponding to each audio element is determined, and the track information of the corresponding image element is determined as the motion track coordinates of the sound source object corresponding to the audio element in the image stream. This can improve the efficiency and accuracy of determining the motion track coordinates of the target audio element corresponding to the sound source object in the image stream.

Referring to FIG. 5B, FIG. 5B shows the acquisition process of the motion track coordinates of different audio elements corresponding to the sound source object in the image stream. Specifically, after receiving the video data, the video data can be decoded at the CPU to obtain the audio stream and the image stream. Furthermore, for the audio stream, the audio stream is separated into audio elements of a plurality of preset sound source object types through a neural network model for audio element separation, and the sound source object type of each audio element corresponding to the sound source object is identified. Types of sound source objects include human voices, musical instruments, animals, machinery, and others. For image streams, image elements of multiple preset image element types in each frame image are identified by a neural network model for object detection, and the plane coordinates of the image elements in each image element and the image element type are identified. Image element types include portraits, musical instruments, animals, and machinery. Finally, based on the sound source object type corresponding to the audio element and the image element type corresponding to the image element through the element matching module, the audio elements and image elements are matched one by one, to obtain the image elements corresponding to different audio elements, such as human voices matching portraits, mechanical sounds matching mechanical products, etc. Then, based on the plane coordinates of the image elements corresponding to the audio elements in each image element, the motion track coordinates of the sound source object corresponding to the audio element in the image stream are determined.

In one of the embodiments, constructing the curved grid matching the display screen of the display device comprises: enlarging an equivalent plane corresponding to the display screen based on preset enlarging parameters to obtain a reference two-dimensional plane and determining a reference origin of the reference two-dimensional plane based on a screen center of the display screen; and constructing a spherical grid with the reference origin of the reference two-dimensional plane and a preset center distance and determining the spherical grid corresponding to a hemisphere where the reference two-dimensional plane is located as a curved grid.

The reference two-dimensional plane refers to the reference two-dimensional plane after scaling the equivalent plane corresponding to the display screen. Specifically, the equivalent plane of the display screen can be magnified based on preset enlarging parameters with the plane center of the equivalent plane corresponding to the display screen as the center point. Still taking the display device as an example of a TV, the height of the display screen of the TV is a plane of 9 by 16, and the equivalent plane of the display screen can be enlarged to obtain a plane of 20 by 20 as a reference two-dimensional plane.

Specifically, after the reference two-dimensional plane is determined, a spherical grid is constructed according to the reference origin of the reference two-dimensional plane and the preset center distance. For example, assuming that the preset center distance is 70 and the coordinates of the center of the sphere are (0, 0, 0), the coordinate information of the reference origin of the reference two-dimensional plane (that is, the screen center of the display screen) is (0, 0, 70). Furthermore, a spherical grid passing through the four vertices of the reference two-dimensional plane is constructed with the coordinates of the center of the sphere, and the spherical grid on the hemispherical surface where the reference two-dimensional plane is located is determined as a curved grid. Still referring to FIG. 3, the two-dimensional plane 310 is a display screen, the two-dimensional plane 330 is a reference two-dimensional plane, and the three-dimensional plane 320 is a curved grid.

In one of the embodiments, acquiring the spatial track coordinates of the sound source object corresponding to each of the audio elements on the curved grid according to the motion track coordinates of the sound source object and the coordinate transformation relationship comprises: performing scaling processing on the motion track coordinates according to the enlarging parameters and acquiring target track coordinates of the sound source object corresponding to each audio element on the reference two-dimensional plane; and calculating the spatial track coordinates of the audio element corresponding to the sound source object on the curved grid according to the target track coordinates.

After obtaining the motion track coordinates of the sound source objects corresponding to different audio elements in the image stream, based on the preset enlarging parameters, the target track coordinates of the audio element corresponding to the sound source object on the reference two-dimensional plane can be calculated first, that is, the X-axis and Y-axis coordinates of the audio element corresponding to the sound source object on the curved grid. Furthermore, based on the following formula (1), the value of the audio element corresponding to the sound source object in the vertical direction in the curved grid can be calculated, that is, the coordinate value of the audio element corresponding to the sound source object on the Z-axis on the curved grid is obtained:

$$Z_{sp} = \sqrt{80^2 - X_{sp}^2 - Y_{sp}^2}$$

$X_{sp}$ and $Y_{sp}$ are the X-axis and Y-axis coordinates of the audio element corresponding to the sound source object on the curved grid (or the reference two-dimensional plane). $Z_{sp}$ is the Z-axis coordinate of the audio element corresponding to the sound source object on the curved grid.

By transforming the image coordinates corresponding to each frame image in the motion track coordinates into the spatial coordinates on the curved grid, the spatial track coordinates on the curved grid are obtained. In addition, the position of the audio element is located based on the spatial track coordinates, and the sound field information in the vertical direction is completed.

It should be understood that the various steps in the flowcharts of FIG. 2, FIG. 4, and FIG. 5 are displayed sequentially as indicated by the arrows, but these steps are not necessarily executed sequentially in the order indicated by the arrows. Unless otherwise specified herein, there is no strict order restriction on the execution of these steps, and these steps can be executed in other orders. Moreover, at least some of the steps in FIG. 2, FIG. 4, and FIG. 5 may include multiple sub-steps or multiple stages. These sub-steps or stages are not necessarily executed at the same time, but can be executed at different times. The execution order of these sub-steps or stages is not necessarily performed sequentially, but may be executed alternately or alternately with at least a part of other steps or sub-steps or stages of other steps.

Figure 6:
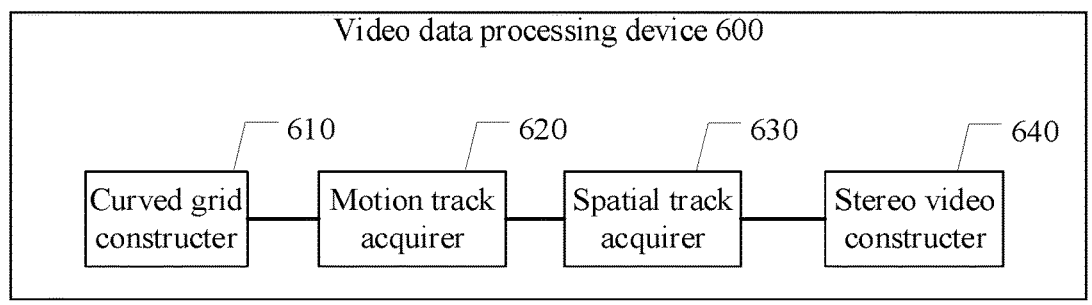
FIG. 6 is a schematic structural diagram of a processing video data device according to one or more embodiments.

In order to better implement the video data processing method provided by the embodiment of the present application, on the basis of the video data processing method proposed in the embodiment of the present application, a video data processing device is also provided in the embodiment of the present application, as shown in FIG. 6, a video data processing device 600 includes:

a curved grid constructer 610 configured to construct a curved grid matching a display screen of the display device and acquire a coordinate transformation relationship between the display screen and the curved grid;

a motion track acquirer 620 configured to acquire an image stream and an audio stream in the video data and identify motion track coordinates of sound source objects in the image stream corresponding to different audio elements in the audio stream according to the image stream and the audio stream;

a spatial track acquirer 630 configured to acquire spatial track coordinates of the sound source object corresponding to each of the audio elements on the curved grid according to the motion track coordinates of the sound source object and the coordinate transformation relationship; and a stereo video constructer 640 configured to construct a stereo video based on the image stream, each of the audio elements in the audio stream, and the spatial track coordinates of each of the audio elements corresponding to the sound source object.

In some embodiments of this application, the motion track acquirer 620 is configured to perform audio data separation on the audio stream to obtain the audio elements; intercept a first image stream synchronized with a target audio element in the image stream for the target audio element in the audio stream; input the target audio element and each frame image of the first image stream into a sound source localization model and obtain sound source position coordinates of the sound source object corresponding to the target audio element in each frame image; and determine the motion track coordinates of the sound source object corresponding to the target audio element in the first image stream according to the sound source position coordinates in each frame image of the first image stream.

In some embodiments of this application, the motion track acquirer 620 is configured to acquire a target frame image and a historical frame image corresponding to a current prediction step from the first image stream; input the target audio element and the historical frame image into the sound source localization model and obtain confidence degrees of different prediction regions of the target audio element corresponding to the sound source object in the target frame image; if a maximum confidence degree among the confidence degrees of each of the prediction regions is greater than a preset confidence threshold value, determine the sound source position coordinates of the target audio element corresponding to the sound source object in the target frame image according to a position information of the prediction region corresponding to the maximum confidence degree; and set the sound source position coordinates of the sound source object corresponding to the target audio element in the target frame image to a null value if the maximum confidence degree among the confidence degrees of each prediction region is less than or equal to the preset confidence threshold value.

In some embodiments of this application, the motion track acquirer 620 is configured to acquire invalid frame images whose sound source position coordinates of the sound source object corresponding to the target audio element are a null value; and if the invalid frame images comprise consecutive invalid frame images whose number is less than a preset value, according to the sound source position coordinates of the target audio element corresponding to the sound source object in a previous frame image and the sound source position coordinates in a subsequent frame image, acquire the sound source position coordinates in the invalid frame images.

In some embodiments of this application, the motion track acquirer 620 is configured to separate audio elements from the audio stream to obtain multiple audio elements and identify a sound source object type of the sound source object corresponding to each of the audio elements; identify plane coordinates and an image element type of each image element in each frame image in the image stream, and according to the plane coordinates of each of the image elements in each of the frame images, acquire a track information of each of the image elements in the image stream; for a target audio element in the audio stream, according to the sound source object type of the sound source object corresponding to the target audio element and the image element type of each of the image elements, determine a target image element matching the sound source object corresponding to the target audio element from the image elements; and if the sound source object corresponding to the target audio element matches the target image element, the motion track coordinates of the sound source object corresponding to the target audio element in the image stream are generated according to the track information of the target image element.

In some embodiments of this application, the curved grid constructer 610 is configured to enlarge an equivalent plane corresponding to the display screen based on preset enlarging parameters to obtain a reference two-dimensional plane and determine a reference origin of the reference two-dimensional plane based on a screen center of the display screen; and construct a spherical grid with the reference origin of the reference two-dimensional plane and a preset center distance and determine the spherical grid corresponding to a hemisphere where the reference two-dimensional plane is located as a curved grid.

In some embodiments of this application, the spatial track acquirer 630 is configured to perform scaling processing on the motion track coordinates according to the enlarging parameters and acquiring target track coordinates of the sound source object corresponding to each audio element on the reference two-dimensional plane; and calculate the spatial track coordinates of the audio element corresponding to the sound source object on the curved grid according to the target track coordinates.

For the specific limitations of the video data processing device, refer to the above-mentioned limitation of the video data processing method, which will not be repeated here. Each module in the above video data processing device may be fully or partially realized by software, hardware and a combination thereof. The above-mentioned modules can be embedded in or independent of the processor in the computer device in the form of hardware, and can also be stored in the memory of the computer device in the form of software, so that the processor can call and execute the corresponding operations of the above modules.

Figure 7:
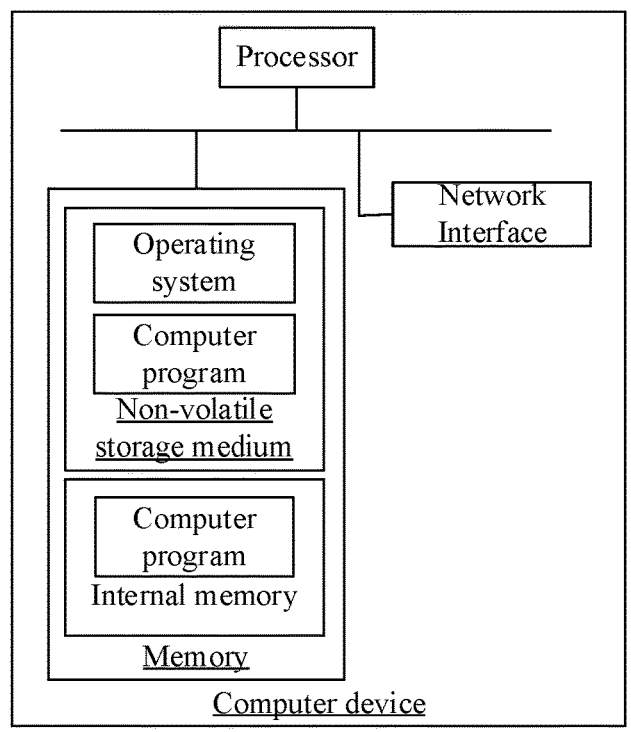
FIG. 7 is a schematic structural diagram of a computer device according to one or more embodiments.

In some embodiments of the present application, the video data processing device 600 may be implemented in a form of computer readable instructions. The computer readable instructions can be executed on a computer device as shown in FIG. 7. Each program module of the video data processing device 600 can be stored in the memory of the computer device, such as the curved grid constructer 610, the motion track acquirer 620, the spatial track acquirer 630, and the stereo video constructer 640 shown in FIG. 9. The computer-readable instructions constituted by the various program modules enable the processor to execute the steps in the video data processing methods of the various embodiments of the application described in this specification.

For example, the computer device shown in FIG. 7 may execute step S210 through the curved grid constructer 610 in the video data processing device 600 shown in FIG. 6. The computer device can execute step S220 through the motion track acquirer 620. The computer device may execute step S230 through the spatial track acquirer 630. The computer device can execute step S240 through the stereo video constructer 640. The computer device includes a processor, memory, and a network interface connected by a system bus. The processor of the computer device is used to provide computing and control capabilities. The memory of the computer device includes a non-volatile storage medium and an internal memory. The non-volatile storage medium stores an operating system and computer readable instructions. The internal memory provides an environment for the execution of the operating system and computer readable instructions in the non-volatile storage medium. The network interface of the computer device is used to communicate with external computer devices via a network connection. When the computer-readable instructions are executed by the processor, a video data processing method is implemented.

Those skilled in the art can understand that the structure shown in FIG. 7 is only a block diagram of a partial structure related to the solution of this application and does not constitute a limitation on the computer device to which the solution of this application is applied. A particular computer device may include more or fewer components than shown in the figures, or combine certain components, or have a different arrangement of components.

Some embodiments of the present application provide a display device. The display device includes one or more processors; a memory; and one or more computer readable instructions, wherein the one or more computer readable instructions are stored in the memory and configured to be executed by the processor to implement the following steps:

constructing a curved grid matching a display screen of the display device and acquiring a coordinate transformation relationship between the display screen and the curved grid;

acquiring an image stream and an audio stream in the video data and identifying motion track coordinates of sound source objects in the image stream corresponding to different audio elements in the audio stream according to the image stream and the audio stream;

acquiring spatial track coordinates of the sound source object corresponding to each of the audio elements on the curved grid according to the motion track coordinates of the sound source object and the coordinate transformation relationship; and constructing a stereo video based on the image stream, each of the audio elements in the audio stream, and the spatial track coordinates of each of the audio elements corresponding to the sound source object.

Those skilled in the art can understand that all or part of the processes in the methods of the above embodiments can be implemented by instructing related hardware through computer-readable instructions. The computer readable instructions can be stored in a non-transitory computer readable storage medium. When executed, the computer-readable instructions may include the processes of the embodiments of the above-mentioned methods. Any reference to memory, storage, database or other media used in the various embodiments provided in this application may include at least one of non-volatile and volatile memory. The non-volatile memory may include read-only memory (ROM), magnetic tape, floppy disk, flash memory or optical memory, and the like. Volatile memory may include random access memory (RAM) or external cache memory. As an illustration and not a limitation, the RAM can be in various forms, such as static random access memory (SRAM) or dynamic random access memory (DRAM).

The technical features of the above embodiments can be combined arbitrarily. To keep the description concise, all possible combinations of the technical features in the above embodiments are not described. However, as long as there is no contradiction in the combination of these technical features, it should be considered as within the scope of the description.

The video data processing method, device, display device, and storage medium provided in the embodiments of the present application have been described in detail above. In this description, specific examples are used to illustrate the principle and implementation of the present invention, and the descriptions of the above embodiments are only used to help understand the method and core idea of the present invention. In addition, for those skilled in the art, according to the concept of the present invention, there will be changes in the specific implementation and application range. In summary, the contents of this specification should not be construed as limiting the present invention.

What is claimed is:

1. A method of processing video data, applied to a display device, comprising:
constructing a curved grid matching a display screen of the display device and acquiring a coordinate transformation relationship between the display screen and the curved grid;
acquiring an image stream and an audio stream in the video data and identifying motion track coordinates of sound source objects in the image stream corresponding to different audio elements in the audio stream according to the image stream and the audio stream;
acquiring spatial track coordinates of the sound source object corresponding to each of the audio elements on the curved grid according to the motion track coordinates of the sound source object and the coordinate transformation relationship; and
constructing a stereo video based on the image stream, each of the audio elements in the audio stream, and the spatial track coordinates of each of the audio elements corresponding to the sound source object;
wherein identifying the motion track coordinates of the sound source objects in the image stream corresponding to the different audio elements in the audio stream according to the image stream and the audio stream comprises:
performing audio data separation on the audio stream to obtain the audio elements;
intercepting a first image stream synchronized with a target audio element in the image stream for the target audio element in the audio stream;
inputting the target audio element and each frame image of the first image stream into a sound source localization model and obtaining sound source position coordinates of the sound source object corresponding to the target audio element in each frame image; and
determining the motion track coordinates of the sound source object corresponding to the target audio element in the first image stream according to the sound source position coordinates in each frame image of the first image stream;
wherein inputting the target audio element and each frame image of the first image stream into the sound source localization model and obtaining the sound source position coordinates of the sound source object corresponding to the target audio element in each frame image comprises:
acquiring a target frame image and a historical frame image corresponding to a current prediction step from the first image stream;
inputting the target audio element and the historical frame image into the sound source localization model and obtaining confidence degrees of different prediction regions of the target audio element corresponding to the sound source object in the target frame image;
if a maximum confidence degree among the confidence degrees of each of the prediction regions is greater than a preset confidence threshold value, determining the sound source position coordinates of the target audio element corresponding to the sound source object in the target frame image according to a position information of the prediction region corresponding to the maximum confidence degree; and
setting the sound source position coordinates of the sound source object corresponding to the target audio element in the target frame image to a null value if the maximum confidence degree among the confidence degrees of each prediction region is less than or equal to the preset confidence threshold value;
wherein determining the motion track coordinates of the sound source object corresponding to the target audio element in the first image stream according to the sound source position coordinates in each frame image of the first image stream comprises:
acquiring invalid frame images whose sound source position coordinates of the sound source object corresponding to the target audio element are a null value; and
if the invalid frame images comprise consecutive invalid frame images whose number is less than a preset value, according to the sound source position coordinates of the target audio element corresponding to the sound source object in a previous frame image and the sound source position coordinates in a subsequent frame image, acquiring the sound source position coordinates in the invalid frame images.

2. The method according to claim 1, wherein identifying the motion track coordinates of the sound source objects in the image stream corresponding to the different audio elements in the audio stream according to the image stream and the audio stream comprises:
separating audio elements from the audio stream to obtain multiple audio elements and identifying a sound source object type of the sound source object corresponding to each of the audio elements;

identifying plane coordinates and an image element type of each image element in each frame image in the image stream, and according to the plane coordinates of each of the image elements in each of the frame images, acquiring a track information of each of the image elements in the image stream;

for a target audio element in the audio stream, according to the sound source object type of the sound source object corresponding to the target audio element and the image element type of each of the image elements, determining a target image element matching the sound source object corresponding to the target audio element from the image elements; and if the sound source object corresponding to the target audio element matches the target image element, the motion track coordinates of the sound source object corresponding to the target audio element in the image stream are generated according to the track information of the target image element.

3. The method according to claim 1, wherein constructing the curved grid matching the display screen of the display device comprises:

enlarging an equivalent plane corresponding to the display screen based on preset enlarging parameters to obtain a reference two-dimensional plane and determining a reference origin of the reference two-dimensional plane based on a screen center of the display screen; and constructing a spherical grid with the reference origin of the reference two-dimensional plane and a preset center distance and determining the spherical grid corresponding to a hemisphere where the reference two-dimensional plane is located as a curved grid.

4. The method according to claim 3, wherein acquiring the spatial track coordinates of the sound source object corresponding to each of the audio elements on the curved grid according to the motion track coordinates of the sound source object and the coordinate transformation relationship comprises:

performing scaling processing on the motion track coordinates according to the enlarging parameters and acquiring target track coordinates of the sound source object corresponding to each audio element on the reference two-dimensional plane; and calculating the spatial track coordinates of the audio element corresponding to the sound source object on the curved grid according to the target track coordinates.

5. The method according to claim 1, wherein constructing the stereo video based on the image stream, each of the audio elements in the audio stream, and the spatial track coordinates of each of the audio elements corresponding to the sound source object comprises:

performing audio rendering processing on each of the audio elements based on control track coordinates of the sound source object corresponding to each of the audio elements to obtain a stereo audio data; and generating a stereo video by combining the stereo audio data and the image stream.

6. A display device, comprising:
one or more processors;
a memory; and
one or more computer readable instructions, wherein the one or more computer readable instructions are stored in the memory and configured to be executed by the processor to implement the following steps:

constructing a curved grid matching a display screen of the display device and acquiring a coordinate transformation relationship between the display screen and the curved grid;

acquiring an image stream and an audio stream in the video data and identifying motion track coordinates of sound source objects in the image stream corresponding to different audio elements in the audio stream according to the image stream and the audio stream;

acquiring spatial track coordinates of the sound source object corresponding to each of the audio elements on the curved grid according to the motion track coordinates of the sound source object and the coordinate transformation relationship; and constructing a stereo video based on the image stream, each of the audio elements in the audio stream, and the spatial track coordinates of each of the audio elements corresponding to the sound source object;

wherein identifying the motion track coordinates of the sound source objects in the image stream corresponding to the different audio elements in the audio stream according to the image stream and the audio stream comprises:

performing audio data separation on the audio stream to obtain the audio elements;

intercepting a first image stream synchronized with a target audio element in the image stream for the target audio element in the audio stream;

inputting the target audio element and each frame image of the first image stream into a sound source localization model and obtaining sound source position coordinates of the sound source object corresponding to the target audio element in each frame image; and determining the motion track coordinates of the sound source object corresponding to the target audio element in the first image stream according to the sound source position coordinates in each frame image of the first image stream;

wherein inputting the target audio element and each frame image of the first image stream into the sound source localization model and obtaining the sound source position coordinates of the sound source object corresponding to the target audio element in each frame image comprises:

acquiring a target frame image and a historical frame image corresponding to a current prediction step from the first image stream;

inputting the target audio element and the historical frame image into the sound source localization model and obtaining confidence degrees of different prediction regions of the target audio element corresponding to the sound source object in the target frame image;

if a maximum confidence degree among the confidence degrees of each of the prediction regions is greater than a preset confidence threshold value, determining the sound source position coordinates of the target audio element corresponding to the sound source object in the target frame image according to a position information of the prediction region corresponding to the maximum confidence degree; and setting the sound source position coordinates of the sound source object corresponding to the target audio element in the target frame image to a null value if the maximum confidence degree among the confidence degrees of each prediction region is less than or equal to the preset confidence threshold value;

wherein determining the motion track coordinates of the sound source object corresponding to the target audio element in the first image stream according to the sound source position coordinates in each frame image of the first image stream comprises:
- acquiring invalid frame images whose sound source position coordinates of the sound source object corresponding to the target audio element are a null value; and
- if the invalid frame images comprise consecutive invalid frame images whose number is less than a preset value, according to the sound source position coordinates of the target audio element corresponding to the sound source object in a previous frame image and the sound source position coordinates in a subsequent frame image, acquiring the sound source position coordinates in the invalid frame images.

7. The display device according to claim 6, wherein identifying the motion track coordinates of the sound source objects in the image stream corresponding to the different audio elements in the audio stream according to the image stream and the audio stream comprises:
- separating audio elements from the audio stream to obtain multiple audio elements and identifying a sound source object type of the sound source object corresponding to each of the audio elements;
- identifying plane coordinates and an image element type of each image element in each frame image in the image stream, and according to the plane coordinates of each of the image elements in each of the frame images, acquiring a track information of each of the image elements in the image stream;
- for a target audio element in the audio stream, according to the sound source object type of the sound source object corresponding to the target audio element and the image element type of each of the image elements, determining a target image element matching the sound source object corresponding to the target audio element from the image elements; and
- if the sound source object corresponding to the target audio element matches the target image element, the motion track coordinates of the sound source object corresponding to the target audio element in the image stream are generated according to the track information of the target image element.

8. The display device according to claim 6, wherein constructing the curved grid matching the display screen of the display device comprises:
- enlarging an equivalent plane corresponding to the display screen based on preset enlarging parameters to obtain a reference two-dimensional plane and determining a reference origin of the reference two-dimensional plane based on a screen center of the display screen; and
- constructing a spherical grid with the reference origin of the reference two-dimensional plane and a preset center distance and determining the spherical grid corresponding to a hemisphere where the reference two-dimensional plane is located as a curved grid.

9. The display device according to claim 7, wherein acquiring the spatial track coordinates of the sound source object corresponding to each of the audio elements on the curved grid according to the motion track coordinates of the sound source object and the coordinate transformation relationship comprises:
- performing scaling processing on the motion track coordinates according to the enlarging parameters and acquiring target track coordinates of the sound source object corresponding to each audio element on the reference two-dimensional plane; and
- calculating the spatial track coordinates of the audio element corresponding to the sound source object on the curved grid according to the target track coordinates.

10. The display device according to claim 6, wherein constructing the stereo video based on the image stream, each of the audio elements in the audio stream, and the spatial track coordinates of each of the audio elements corresponding to the sound source object comprises:
- performing audio rendering processing on each of the audio elements based on control track coordinates of the sound source object corresponding to each of the audio elements to obtain a stereo audio data; and
- generating a stereo video by combining the stereo audio data and the image stream.

11. A method of processing video data, applied to a display device, comprising:
- constructing a curved grid matching a display screen of the display device and acquiring a coordinate transformation relationship between the display screen and the curved grid;
- acquiring an image stream and an audio stream in the video data and identifying motion track coordinates of sound source objects in the image stream corresponding to different audio elements in the audio stream according to the image stream and the audio stream;
- acquiring spatial track coordinates of the sound source object corresponding to each of the audio elements on the curved grid according to the motion track coordinates of the sound source object and the coordinate transformation relationship; and constructing a stereo video based on the image stream, each of the audio elements in the audio stream, and the spatial track coordinates of each of the audio elements corresponding to the sound source object;
- wherein constructing the curved grid matching the display screen of the display device comprises:
  - enlarging an equivalent plane corresponding to the display screen based on preset enlarging parameters to obtain a reference two-dimensional plane and determining a reference origin of the reference two-dimensional plane based on a screen center of the display screen; and
  - constructing a spherical grid with the reference origin of the reference two-dimensional plane and a preset center distance and determining the spherical grid corresponding to a hemisphere where the reference two-dimensional plane is located as a curved grid;
- wherein acquiring the spatial track coordinates of the sound source object corresponding to each of the audio elements on the curved grid according to the motion track coordinates of the sound source object and the coordinate transformation relationship comprises:
  - performing scaling processing on the motion track coordinates according to the enlarging parameters and acquiring target track coordinates of the sound source object corresponding to each audio element on the reference two-dimensional plane; and
  - calculating the spatial track coordinates of the audio element corresponding to the sound source object on the curved grid according to the target track coordinates.

12. The method according to claim 11, wherein constructing the stereo video based on the image stream, each of the audio elements in the audio stream, and the spatial track coordinates of each of the audio elements corresponding to the sound source object comprises:
- performing audio rendering processing on each of the audio elements based on control track coordinates of the sound source object corresponding to each of the audio elements to obtain a stereo audio data; and
- generating a stereo video by combining the stereo audio data and the image stream.

\* \* \* \* \*